Figure 1:
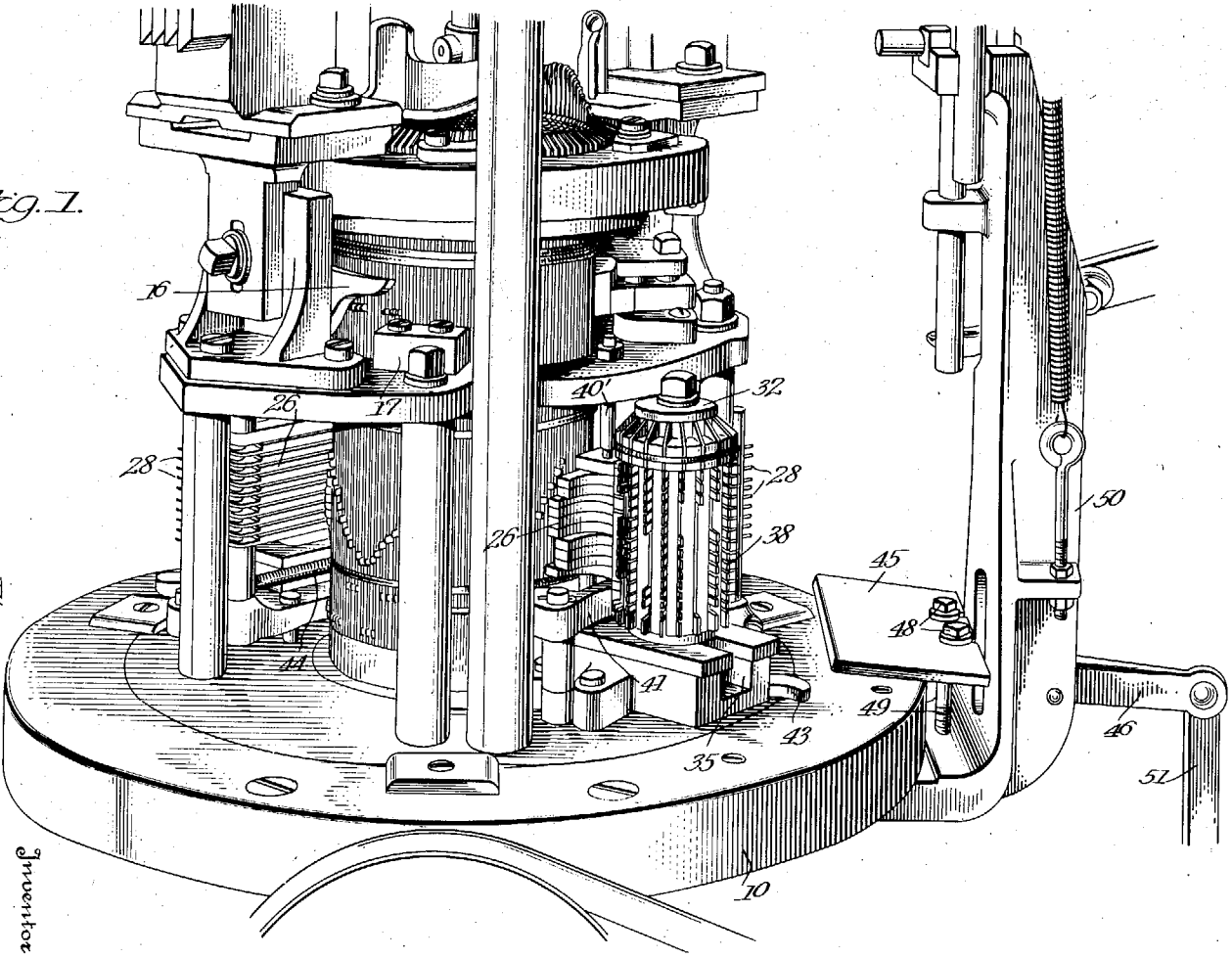

June 17, 1930. E. U. AMES Re. 17,705

KNITTING MACHINE

Original Filed March 19, 1926 4 Sheets-Sheet 1

Inventor

Elmer U. Ames, deceased,
by Caroline F. Ames Administratrix.

By A. W. Dohr,

Attorney

June 17, 1930. E. U. AMES Re. 17,705
KNITTING MACHINE
Original Filed March 19, 1926 4 Sheets-Sheet 2
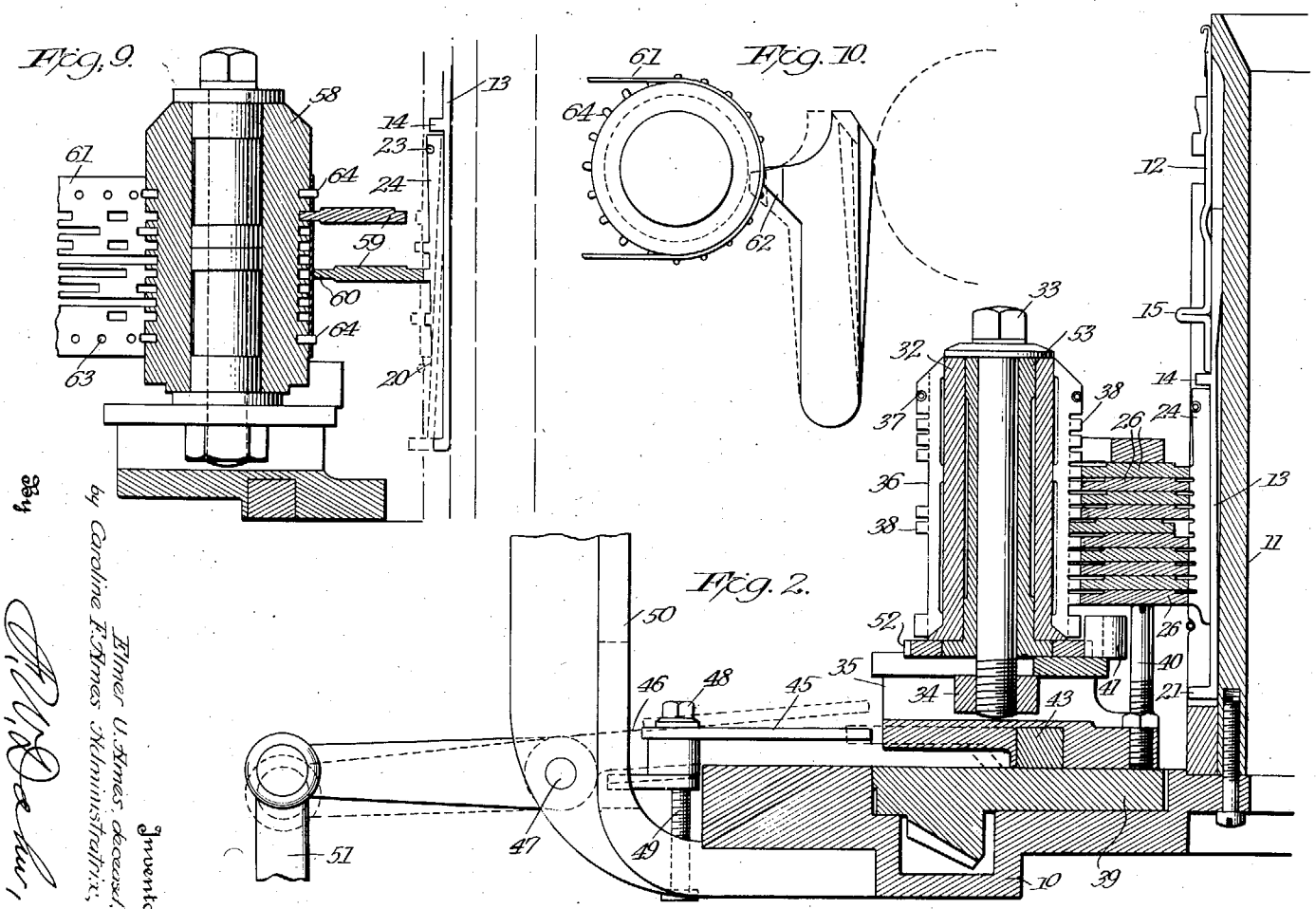
Inventor
Elmer U. Ames, deceased,
by Caroline F. Ames Administratrix,
By F. W. Dahlw,
Attorney June 17, 1930.
E. U. AMES
Re. 17,705
KNITTING MACHINE
Original Filed March 19, 1926 4 Sheets-Sheet 3
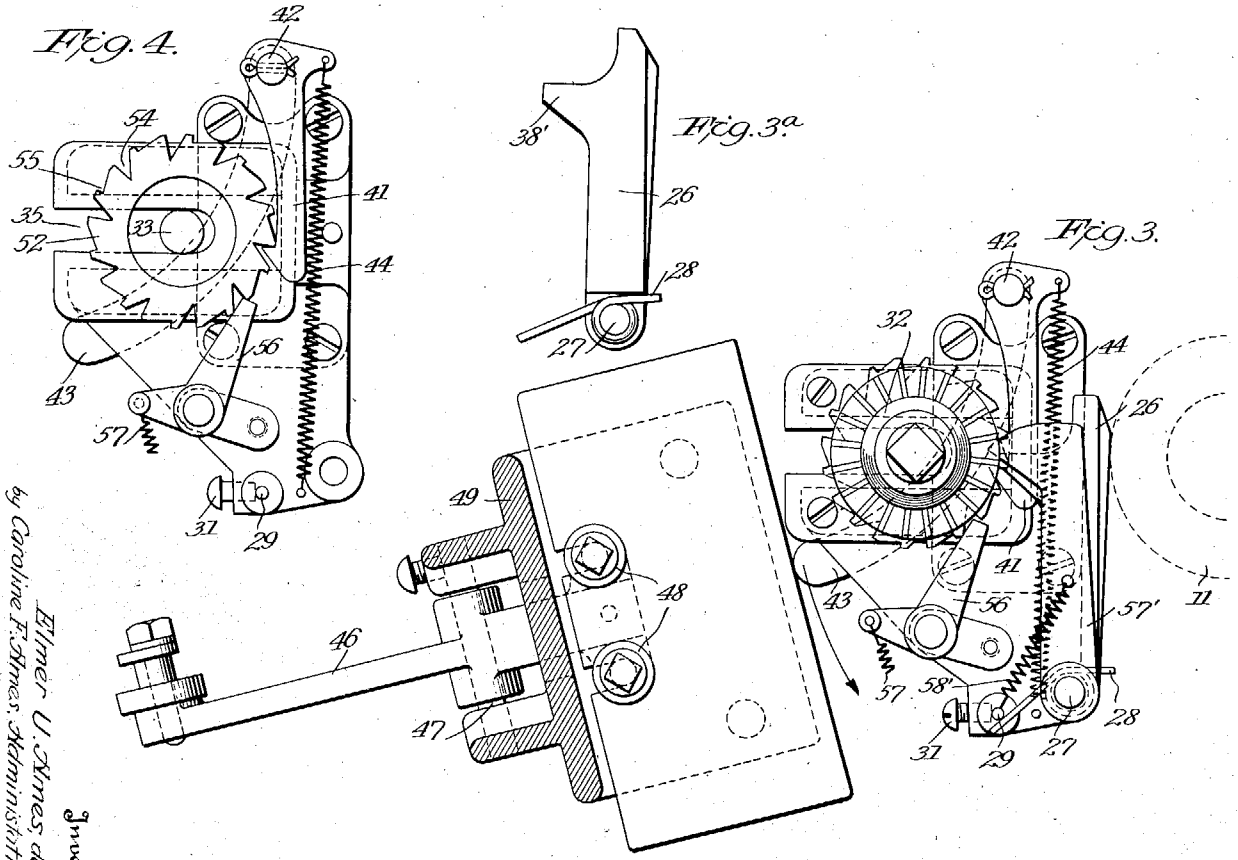
Inventor
Elmer U. Ames, deceased
by Caroline F. Ames, Administratrix.
By F. V. Dahr,
Attorney June 17, 1930.
E. U. AMES
Re. 17,705
KNITTING MACHINE
Original Filed March 19, 1926 4 Sheets-Sheet 4
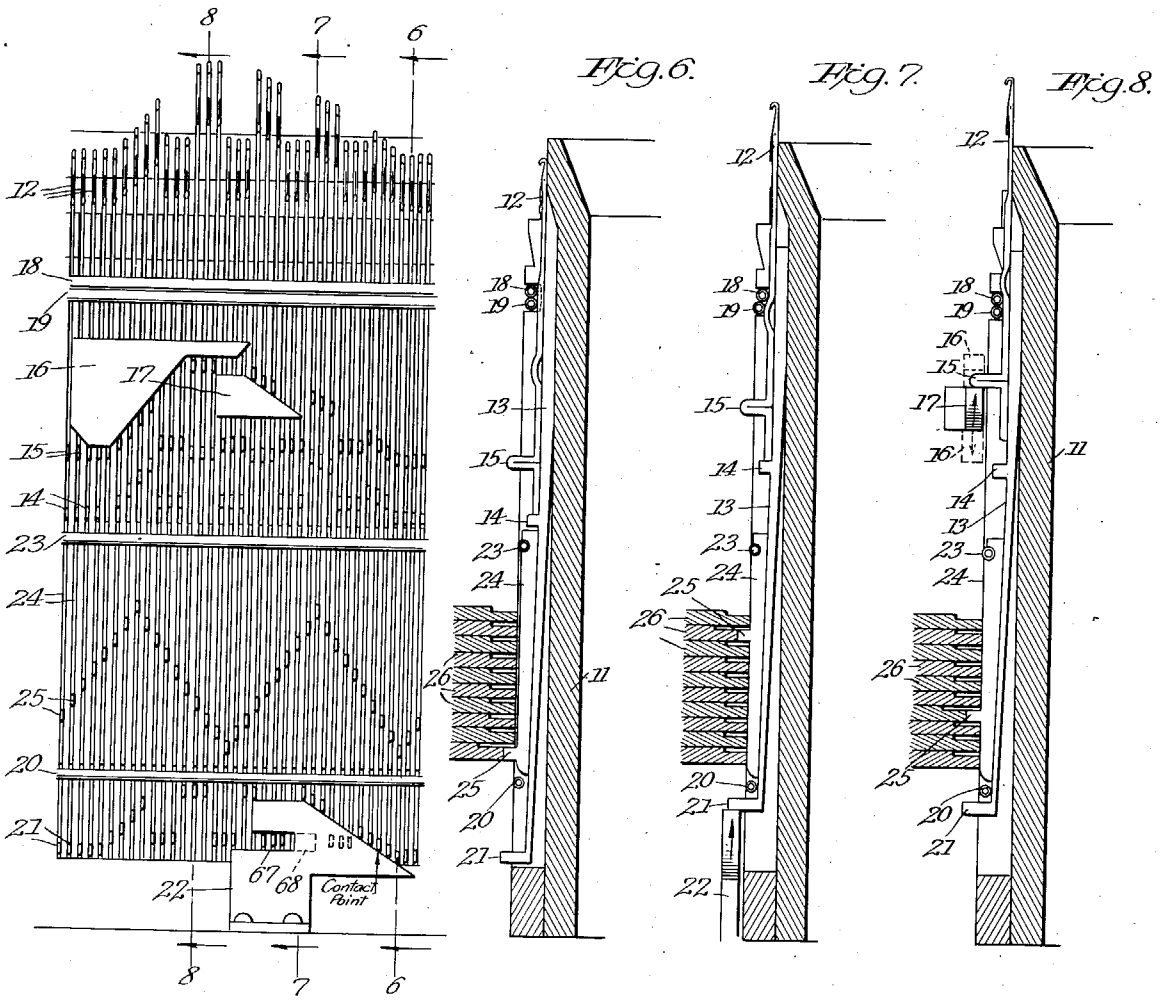
Inventor
Elmer U. Ames, deceased.
by Caroline F. Ames Administratrix.
By
Attorney Reissued June 17, 1930

Re. 17,705

UNITED STATES PATENT OFFICE

ELMER U. AMES, DECEASED, LATE OF COLLINGSWOOD, NEW JERSEY, BY CAROLINE F. AMES, ADMINISTRATRIX, OF HADDONFIELD, NEW JERSEY

KNITTING MACHINE

Original No. 1,722,989, dated August 6, 1929, Serial No. 96,049, filed March 19, 1926. Application for reissue filed April 29, 1930. Serial No. 448,390.

The said invention relates to knitting machines and particularly to mechanism for selecting needles for special operations, as for the formation of drop stitch, tuck stitch and various other forms of knitting. The mechanism is here illustrated in connection with a circular knitting machine for making hose tops and the like said machine having a stationary needle cylinder and a rotary cam ring but is clearly applicable to machines having a rotary needle cylinder, to ribbing machines, footers, etc. and certain features thereof may be found applicable for use in machines of other types such as straight machines. It is an object of the invention to provide mechanism of the character described which shall cover a very wide range of possible changes for making various patterns in the knit fabric.

Another object of the invention is to provide extreme mutability to secure many pattern changes in the fabric with relatively simple mechanism which shall be inexpensive to manufacture, easy to manipulate for changing the patterns and not liable to get out of order.

A further object of the invention is to provide means whereby a pattern change may extend over a greater length of the fabric than has heretofore been possible, before proceeding to make a repeat.

This application is, in part, a continuation of application Serial No. 25,915, filed April 25, 1925, of application 717,182, now Patent No. 1,697,488, and of application 717,184, now Patent No. 1,697,490. Certain parts are also claimed in divisional application 352,503, April 4, 1929.

Referring to the accompanying drawings which are made a part hereof and on which similar reference characters indicate similar parts, Figure 1 is a perspective showing the means applied to a circular knitting machine of standard type, together with various cooperating parts, Figure 2, a vertical section at one side of the axis, Figure 3, a horizontal section above the trick wheel, Figure 3ª, a detail of parts shown in Figure 3, Figure 4, a similar section below the tricks of the trick wheel showing the driving means for the wheel, Figure 5, an elevation of a part of the needle row, Figure 6, a section on line 6—6 of Figure 5, Figure 7, a section on line 7—7 of Figure 5, Figure 8, a section on line 8—8 of Figure 5, Figure 9, a vertical section showing a trick wheel of modified form, and Figure 10, a horizontal section of the same.

In the drawings reference character 10 indicates the fixed frame of the machine on which is a needle cylinder 11 provided with radial slots which may be of conventional character and which serve as guiding means for needles 12. The needles are here shown as latch needles but may be of any desirable or conventional character. Jacks or projectors 13 are arranged in underlying relation to the needles and parallel thereto said jacks being buried in the needle slots back of the needles and having lugs 14 adapted to engage with the lower ends of the needles which in turn are provided with butts 15 for engagement with needle cams such as indicated at 16 and 17. The needles are held in place as usual by spring rings 18 and 19 and a spring ring 20 near the lower end of the needle grooves serves to hold the lower ends of the jacks in place to prevent them from moving out too far. The jacks are provided at their lower ends with butts 21 for engagement by a raising cam 22 positioned to engage under the butts to raise the jacks and the needles when these parts are in the position shown in Figures 6 to 8.

A spring ring 23 lies in a groove in the outer periphery of the cylinder approximately midway between the ring 20 and the upper rings 18 and 19. The ring 23 serves to hold in place a series of pressers or sub-jacks 24 lying in the respective needle slots in front of the jacks. For convenience the pressers are shown in Figures 5 to 8 as being provided each with a single butt 25, but it will be understood that there may be a plurality of butts on each of the pressers. In a preferred method of making the butts each presser is provided with a complete row of butts, as in the case of the presser indicated in Figure 2, said butts corresponding to the number of the cams 26 and the butts not needed for the formation of the desired pattern are broken off prior to positioning the pressers in front of the jacks in the respective needle slots.

The cams 26 are here shown as comprising two independent sets corresponding to the two yarn-feeds (or sets of yarn guides) of a hose-top machine. Each set of cams is pivotally supported on a post 27 and the cams are provided with springs 28 arranged to move the cams away from the needle cylinder and so out of engagement with the presser butts 25. A rod 29 for tensioning the springs is secured in position on the frame by a set-screw 31.

Actuating mechanism for the cams 26 comprises trick wheels 32 rotatable on posts 33 (Fig. 2). In the present embodiment of the invention the posts are shown in the form of square-headed bolts held in place by nuts 34 fitting in suitable under-cut slots at 35 on the frame. It will be obvious that by turning a bolt its nut may be loosened and its trick wheel can be moved radially in or out with respect to the needle cylinder for positioning the trick wheel properly with respect to its cams 26. The term trick-wheel as used herein may be roughly defined as denoting a pattern form with a series of slots adopted to receive inserts (tricks) each of which carries a plurality of pattern indications such as projecting lugs. The use of an upright drum, as described in the co-pending application 25,915, with a suitably shaped periphery for acting on transmitting elements such as therein shown at 25, is contemplated as being within the scope of the invention as is also the use of a pattern band (Figs. 9 and 10) and other equivalent devices.

Each trick wheel has a series of radial slots in which are mounted tricks 36 held in place by a spring ring 37. It will be seen that the tricks are therefore readily removable in similar manner to the pressure 24, the jacks 13 and the needles 15. The tricks are provided with lugs 38 suitably spaced for engagement with the noses 38′ of the respective cams and in the preferred method of manufacture each trick is provided with a series of lugs sufficient in number for actuating all the cams. Such lugs as are not needed for a particular pattern are subsequently broken out leaving only the correct number for the pattern desired. For example Figure 2 shows at the left-hand side of the trick wheel a trick with two lugs in operative relation to the cams and at the right-hand side a trick with nine lugs in such operative relation, there being also three lugs shown in a position too high to be available for operation of any of the cams. The trick wheel and the cams are mounted on a ring 39 mounted for rotation about the needle cylinder in any convenient manner which ring carries the cam ring, as is usual in machines of this type. This support also carries a post 40 (Fig. 2) engaging the lowermost cam 26 to prevent sagging and consequent binding on the pivot post 27, while another part secured to the fixed frame carries a post 40′ arranged to prevent upward displacement of the cams and a pawl 57′ hereinafter described.

It will be seen that with the parts in the position indicated, e. g. in Figures 2 and 3, the same pressers will be actuated in successive revolutions to press the same jacks inward whereby the same needles will be prevented from rising to take the yarn at the feed corresponding to the trick wheel shown in said figures and said needles may therefore be caused to knit only with the yarn from the other feed, it being understood that the machine here illustrated is provided with two sets of yarn guides corresponding to the two needle controlling pattern mechanisms indicated in Figure 1. While the controlling means is described as intended for causing the needles either to go into action for knitting or to remain entirely out of action it is not necessarily limited to such control.

For indexing, i. e., rotating the trick wheels step by step on their axes as they revolve about the axis of the machine there has been provided means comprising a pawl 41 pivoted on an arcuate bar 43 slidably supported in a curved slot on the rotating ring 39. A spring 44 is connected at one end to a lug rigid with the pawl 41 and at the other end to a part fixed to the ring 39, said spring serving thus to move the pawl toward the trick wheel and thereby cause it to engage in the spaces between the tricks. It will be seen therefore that longitudinal movement of the bar 43 in one direction will cause the pawl to advance relatively to the trick wheel whereas movement in the other direction will cause the pawl to move the trick wheel if its tooth is permitted to engage between the tricks, in which case the trick wheel will be rotated at each revolution of the cam ring to change the operative relation of the trick wheel and the cams relatively to the pressers for the jacks.

Operating means for the bar 43 comprises an abutment plate 45 fixed to the forward end of a lever 46 pivoted at 47 by means of a pair of set-screws 48 engaging in slots in the plate 45 and thus providing for radial adjustment of the plate to vary the cam action on the bar 43. Downward movement of the rockarm is limited by one or more set-screws 49 in the fixed arm 50 on which the rockarm is pivoted. This post also carries the controlling mechanism for the yarn guides but these elements are not described as they form no part of the present invention. A link 51 connects the lever 46 to pattern mechanism of suitable character for moving the plate 45 into and out of operative relation to the slide bars 43 of the respective trick wheels. In this way each trick wheel may be rotated at each revolution of the machine or they may be rotated alternately and in larger machines where the number of trick wheels and yarn feeds is increased the trick wheels may be operated in any desirable sequence for producing various effects in the fabric. Obviously the trick wheels may also be permitted to remain without rotation for any desirable length of time.

The pawl 41 may operate directly on the trick wheel so as to move the trick wheel each time the arcuate bar 43 is moved, such operation being pattern-controlled as just explained. In the present embodiment of the invention however, there has been shown a ratchet 52 supported for rotation about the post 33 as an axis and preferably as shown in Figure 2 the ratchet is mounted for rotation about a flange on a bushing 53 held by the post 33 against rotation while the trick wheel is journaled on this bushing. The ratchet has deep indentations as at 54 and shallow indentations as at 55 (Fig. 4) in either one of which the pawl is adapted to engage when it is actuated by the bar 43. Should the pawl engage in a deep indentation it will also be enabled to engage between tricks of the trick wheel as will be evident from consideration of Figure 2 so as to rotate the trick wheel. On the other hand should the pawl engage a shallow indentation it will not engage the trick wheel and only the ratchet will be rotated. It results consequently that where the ratchet is used the pawl can operate the trick wheel only on alternate actuations of the pawl. If the plate 45 is in the dotted line position of Figure 2 the pawl will not be operated and the needles will operate as in the previous course of knitting. The ratchet is centered and held against overrunning by means of a detent 56 held in place by a spring 57. A pawl 57′ serves to hold the trick wheel in place during operations and to center it with reference to the coacting elements under pressure of spring 58′.

In a modified form of the invention, as illustrated in Figures 9 and 10 the trick wheel 58 cooperates with cams 59 acting on pressers 24, jacks 13 and needles 12 all as in the form previously described. The cams 59 in this form of the invention have noses 60 reduced at both sides to enter notches in a ribbon 61 (preferably endless). The noses here are shown as reduced at both sides though they may be reduced at one side only as shown in the modification previously described or may be otherwise of suitable form to pass through any kind of suitable apertures in a ribbon of the character described. The ribbon travels in the direction of the arrow and the cams are provided at 62 with inclined faces whereby they will be caused to ride out of the slots in the ribbon and the corresponding recesses in the trick wheel as the wheel rotates. The ribbon may be driven in any suitable manner, i. e. either by driving the trick wheel or by some other driving means and is provided with apertures at 63 for engagement by pins 64 projecting from the wheel.

It is believed that the operation of the device may be clearly understood from the foregoing description. In a characteristic operation of the device the needles, jacks, and pressers may be arranged as indicated in Figure 5, the needles and jacks being all similarly positioned and duplicates of each other while the pressers are differentiated by the varying positions of their butts. The cams 26 also are duplicates of each other while the tricks in the trick wheel have butts arranged according to the desired pattern. According to the position of the tricks certain of the cams will now be pressed toward the cylinder by the butts to flex the corresponding jacks toward the axis of the cylinder and thus move them out of the way of the cam 22. The jacks will therefore not be raised and the corresponding needles, as will be understood from consideration of Figure 2, will not be raised to clear their latches and take the new yarn at the corresponding feed while the needles of the jacks that have not been forced in will be so raised.

It will be assumed for convenience that the needles are rendered active or inactive in groups of three due to the arrangement of retained presser butts and the trick butts, as indicated in Figure 5. Now as the cams move in the direction of the arrows past the needle row the cams 26 will act on certain of the pressers 24 to flex their jacks and bring them out of reach of the cam 22 whereupon the butts of these jacks will pass behind the cam 22, as indicated in dotted lines in Figure 5. It is desirable to permit the jacks butts to spring out again as soon as possible in order to avoid difficulties arising from the tendency of the needles to be sprung outward radially by the flexing of the jack and for this reason the cam 22 is cut away at 67 while an inclined surface at 68 connects the rear face of the cam with the slot 67 so that the outward movement of the butts may be a controlled one and not a sudden snapping out. It is understood, of course, that the pressers and cams are held in only during the movement of the trick wheel through a relatively small arc.

The control of the trick wheel on the pressers to determine whether a jack shall ride up the inclined upper face of the cam 22 or not becomes operative at the line marked "contact point" in Figure 5 so that all the jacks will be lifted a little distance above the normal position and thereafter will either pass back of the cam or ride on up as indicated for the first two solid line butts following the three shown in dotted lines as passing back of the cam 22. The active butts of each active group of three jacks will continue to be lifted by the cam until they pass over the top of the same (Fig. 7) and thus will raise the needles sufficiently high to permit their butts to strike the needle raising cam 17 a little above its extreme low point whereupon the needles will continue to be lifted into a position where the latches are cleared and the new yarn is taken by them (Fig. 8), while the raised jacks remain in elevated position. Thereafter the active needles are moved downward by the stitch cam 16 and consequently force their jacks down to the extreme low level. The inactive needles also strike the stitch cam near the bottom of the stitch drawing incline and are forced back to the lower-most position carrying with them their jacks to bring the butts from the slightly raised position shown at the bottom of Figure 5 to the lower-most position.

At the next rotation of the cam ring the same operation may be repeated if the abutment plate 45 remains in the position shown in Figure 1. If, however, it has been returned to the position of Figure 2 then the bar 43 will strike it and will cause pawl 41 to turn the ratchet 52. If now the pawl engages a deep slot in the ratchet it will also engage between two tricks of the trick wheel and "index" or turn the wheel one step thereby causing the needle operation to vary unless the trick now to be operative is a duplicate of the one previously in action. A similar operation may occur at each feed, if there are more feeds than one, it being understood that there may be four or more on a machine of large diameter.

The operation of the machine with the mechanism shown in Figures 9 and 10 is substantially the same as in the form heretofore described excepting that longer patterns may be made owing to the greater length of the ribbon 61 as compared with the circumference of a trick wheel.

It will be understood that either wheel or both may be actuated during a revolution of the cam ring or neither may be actuated according to the control of the abutment plate 45 by the pattern mechanism below the head of the machine. It is also possible to use a single wheel with a plurality of feeds, e. g., for a fabric having a pattern of solid color and a ground of alternating rounds of yarns of each feed. A wheel may be used at each feed and each wheel may be moved at each rotation of the cam ring or they may be moved by alternate rotations or one may remain out of action while a complete pattern is knit with the other and then the first wheel is put into action while the second remains out during the knitting of the second pattern. It will be obvious that the cams 26 must be out of action if a wheel is to be out of action. For this purpose a trick may be omitted or a trick having all its butts broken off may be used. When plain knitting is to be done, as before and after the pattern at the upper end of a stocking obviously each trick wheel must be made idle at the same time, by this or equivalent expedient. It is possible also to knit longer patterns by using first one wheel and then the other in which case the yarns will be reversed if the second wheel is arranged as the complement of the first.

Among other advantages of the arrangement may be mentioned the facts that solid effects may be secured in the pattern instead of two-tone effects for the reason that the inactive yarn may be thrown well to the rear of the active yarn; that a solid pattern is made which stands out in such a manner that cotton yarn may be used for both the main and the pattern yarn instead of it being necessary to use silk for the pattern yarn as heretofore; that the variation of patterns is almost infinite; and that patterns may be made of an unusual length.

Other changes than those suggested will occur to those skilled in the art and it will also be obvious to those skilled in the art that other variations may be made in the machine without departing from the spirit of the invention; therefore the invention is not limited to what is shown in the drawings and described in the specification but only as indicated in the appended claims.

Having thus fully described the said invention, what is claimed as new and is desired to be secured by Letters Patent is:

1. In an independent needle knitting machine, knitting needles and means for elevating them selectively comprising strip-like elements individual to said needles said strip-like elements each having one or more butts variously located along their length and having a movement transversely of the needle bed, and pattern means adapted to act on each butt for imparting such transverse movement to the strip-like elements, said elements and said pattern means moving constantly past each other in the operation of the machine.

2. A knitting machine comprising a series of needles, needle cams, a series of jacks for moving such needles into operative relation with the needle cams, a jack cam, means for moving the jacks into and out of operative relation to said cam including a series of pressers each operative only on one jack of the series, said pressers having butts at different points in their length, a series of cams movable into and out of operative relation relative to said presser-butts, and means for moving said cams selectively, substantially as set forth.

3. A knitting machine comprising a series of needles, a series of jacks for moving such needles, a jack cam, means for moving the jacks into and out of operative relation to said cam including a series of pressers having butts at different points in their length, a series of cams movable into and out of operative relation relative to said presser butts, and a rotary trick wheel having tricks acting directly on said cams for actuating them selectively, substantially as set forth.

4. A knitting machine comprising a series of needles, a series of jacks for moving such needles, a jack cam, means for moving the jacks into and out of operative relation to said cam including a series of pressers having butts at different points in their length, a series of cams movable into and out of operative relation relative to said butts, a rotary trick wheel having tricks for actuating said movable cams selectively, and means for indexing the trick wheel between the knitting of successive courses, substantially as set forth.

5. A knitting machine comprising a series of needles, a series of jacks for moving such needles, a jack cam, means for moving the jacks into and out of operative relation to said cam including a series of pressers having butts at different points in their length, a series of cams movable into and out of operative relation relative to said butts, a rotary trick wheel having tricks for actuating said movable cams selectively, and pattern-controlled means for indexing the trick wheel, substantially as set forth.

6. In a knitting machine, a series of independent needles, a bed therefor, needle actuating cams, a series of jacks for moving the needles into the range of said cams, a cam for actuating the jacks, pressers for moving the jacks out of range of the jack-cam, and pattern-controlled means wholly on the needle side of the bed for operating the pressers, substantially as set forth.

7. In a knitting machine, a series of independent needles, needle actuating cams, a series of jacks for moving the needles into the range of said cams, a cam for actuating the jacks to move selected needles, pressers for moving the jacks out of range of the jack-cam, pattern-controlled means for operating the pressers including a trick wheel having longitudinal slots, and removable differentiated tricks in said slots, substantially as set forth.

8. In a knitting machine, a series of independent needles, a series of cams for actuating said needles, means for bringing the butts of the needles into and out of operative relation with the cams including a trick wheel revolving with the needle cams, removable tricks extending lengthwise of the wheel, said tricks having integral projecting butts at different points in their length, a pawl for rotating the trick wheel on its axis, and a pattern-controlled abutment plate on the fixed frame of the machine movable into and out of operative relation with said pawl, substantially as set forth.

9. In a knitting machine, a series of independent needles, a series of cams for actuating said needles, means for bringing the butts of the needles into and out of operative relation with the cams including a trick wheel revolving with the needle cams, a pawl for rotating the trick-wheel, a pattern-controlled abutment plate on the fixed frame of the machine movable into and out of operative relation with said pawl, a ratchet positioned concentrically with the trick wheel, said ratchet having deep notches and shallow notches, and a pawl for engagement with said notches the deep notches permitting the pawl to engage the trick wheel and the shallow notches preventing such engagement, substantially as set forth.

10. A circular knitting machine comprising a stationary needle cylinder, a series of needles therein, a cam ring, a set of rotary needle cams on said cam ring, jacks movable parallel to the needles to bring the needles into reach of a needle cam and having parts underlying the needle shanks, a jack-actuating cam, pressers in the needle grooves positioned to act selectively on said jacks, and means for actuating said pressers selectively to move said jacks out of reach of said cam including a planetary element on said cam ring, substantially as set forth.

11. A circular knitting machine comprising a stationary needle cylinder, a series of needles therein, a cam ring, a set of rotary needle cams on said cam ring, jacks movable parallel to the needles to bring the needles into reach of a needle cam, a jack-actuating cam, pressers in the needle grooves positioned to act selectively on said jacks, means for actuating said pressers selectively to move said jacks out of reach of said cam including a planetary element on said cam ring, and pattern-controlled means for rotating such planetary element at predetermined intervals, substantially as set forth.

12. A circular knitting machine comprising a stationary needle cylinder, a series of needles therein, a cam ring, a set of rotary needle cams on said cam ring, jacks movable parallel to the needles and having parts underlying the needle shanks, a jack-actuating cam, pressers in the needle grooves positioned to act selectively on said jacks, means for actuating said pressers selectively to move said jacks out of reach of said cam including a planetary element on said cam ring, and pattern-controlled means for rotating such planetary element at predetermined regular or irregular intervals, substantially as set forth.

13. A knitting machine comprising a slotted needle bed, a needle slidable in a slot in said bed, a jack lying in said slot with operating means projecting therefrom, said jack being movable with the needle and independently thereof, means on the jack for engaging the needle to raise the same, a cam directly engaging the projecting means to actuate the needle, and selective means acting on the outer face of the jack to prevent engagement of the jack and the jack-cam, substantially as set forth.

14. A knitting machine comprising a slotted needle cylinder, a needle slidable in a slot in said cylinder, a jack movable in said slot with the needle and independently thereof, means on the jack for contacting with the needle to raise the same, a cam for actuating the jack, means to prevent contact of the jack and the jack-cam including a cam outside the needle cylinder movable toward and from the jack, and a rotary device for actuating said last-named cam, substantially as set forth.

15. In a knitting machine, a slotted needle cylinder, needles therein, means for controlling the operation of individual needles including a longitudinally grooved wheel parallel to the needle cylinder, differentiated tricks interchangeably positioned in the grooves of the wheel and stationary with respect to movement lengthwise of the wheel, strip-like elements in the needle slots positioned to be operated selectively by said tricks, connections from said elements to the needles in the respective grooves, and means for intermittently rotating the wheel, substantially as set forth.

16. In a knitting machine, a needle cylinder, a trick wheel rotatable about an axis parallel to that of the needle cylinder, a cam ring rotatable relatively to the needle cylinder, strip-like tricks on the wheel, said tricks having lugs at different elevations adapted to act selectively on the needles, and means for turning the wheel step-by-step, said means being adapted to be actuated at each rotation of said relatively rotatable parts, substantially as set forth.

17. In a knitting machine, a needle cylinder, a trick wheel rotatable about an axis parallel to that of the needle cylinder, a cam ring rotatable relatively to the needle cylinder, interchangeable differentiated tricks extending in the direction of the length of the wheel adapted to act selectively on the needles, means for turning the wheel, said means being adapted to be actuated at each rotation of said relatively rotatable parts, and means to disable said wheel rotating means during predetermined rotations of such relatively rotatable parts, substantially as set forth.

18. In a knitting machine, a slotted needle bed, a cam normally actuating all the needles, a trick wheel on an axis parallel to the needles, said wheel carrying interchangeable strip-like elements parallel to its axis with lugs thereon differently positioned relatively to the length of the wheel, and butts variously positioned lengthwise of the needle slots, said butts being operatively connected to said lugs for controlling the relation of said needles to said cam whereby the pattern may be varied by rearrangement of the lugs or the butts or both.

19. In a knitting machine, a slotted needle bed, needle cams, a needle in a slot of the bed out of control of said needle cams, a jack movable lengthwise of the slot to bring the needle into control of a needle cam, a jack cam, means for moving the jack into and out of operative relation to its cam including a presser with a plurality of butts, and means acting selectively on said butts.

20. In a knitting machine, a slotted needle bed, a needle in a slot of the bed, needle cams, a jack movable lengthwise of the slot to effect the operation of the needle, a jack cam, a trick wheel having its axis parallel to the needles and having interchangeable strip-like elements axially located thereon with pattern characteristics arranged at different points along their length, means for rotating the wheel, and means operable by said pattern characteristics for selectively moving the jacks out of operative relation to the jack cam.

21. In a knitting machine, a slotted needle cylinder, needles slidable in slots in said cylinder, elements parallel to one or more of said needles for controlling the raising of the needles, said elements having projecting butts variously positioned along their length and being movable radially of said cylinder, and a pattern device having pattern characteristics arranged in rows parallel to the needles, said pattern characteristics selectively controlling the action of the needles through said butts.

22. In a knitting machine, a slotted needle cylinder, needles in the slots of the cylinder, a trick wheel rotatable on an axis parallel to that of the cylinder, interchangeable tricks in stationary position on the trick wheel, differentiated butts on the tricks, means for rotating the wheel intermittently, and means operable by said butts for selectively controlling the action of the needles according to the position of the trick wheel, said means including a plurality of radially movable cams at various elevations each cam having a vertical cam face adjacent the needle cylinder.

23. In an independent needle knitting machine, knitting needles adapted to be selectively raised, means to raise the needles comprising strip-like elements individual to said needles and movable transversely of the needle bed, said strip-like elements each having one or more butts at the needle side of the bed variously located along their length, and a pattern surface constantly moving relatively to said elements for so moving them, said pattern surface having pattern controlling agencies for each of said butts.

24. A knitting machine having a set of needles, cams for reciprocating the needles, jacks adapted to contact with the needles for raising needles selectively, means for actuating the jacks, sub-jacks approximately parallel to the needles for controlling the relation of the jacks and their actuating means, and pattern means at the needle side of the bed for controlling the action of said sub-jacks.

25. In a knitting machine, a series of needles, a series of jacks for raising the needles, a series of sub-jacks approximately parallel to the needles, differentiated butts on the sub-jacks, means for actuating the jacks, and means at the needle side of the bed acting on the butts of the sub-jacks for selectively controlling the operation of the jacks, substantially as set forth.

26. In a knitting machine, a slotted needle bed, a series of independent needles having butts projecting from the slots in said bed, means for moving the needles endwise including slidable jacks, means for actuating the jacks, means for controlling the engagement of the jacks and their actuating means including sub-jacks in said slots having butts projecting from said slots at the same side of the needle bed as the needle-butts, and selective actuating means for the sub-jacks, substantially as set forth.

27. In a knitting machine, a needle bed having slots, a series of needles in said slots, needle cams relatively movable across said slots, a series of jacks for moving the needles endwise by movement in the direction of the length of the needles, means to control the action of the jacks selectively including sub-jacks parallel to the needles, said sub-jacks being movable to impart transverse movement to the jacks, and controlling means for the sub-jacks at the same side of the needle bed as said needle cams, substantially as set forth.

28. In a knitting machine, a series of independent needles, a needle bed slotted to receive said needles, means for moving the needles endwise including jacks adapted to contact with the needles, means for actuating the jacks including a jack-contacting lifting cam having relative movement crosswise of the slots in said bed, means for controlling the engagement of the jacks and their actuating means including sub-jacks in said slots and having butts projecting therefrom, and selective actuating means for the sub-jacks said selective actuating means operating on the sub-jacks at the same side of the needle bed as said jack cam, substantially as set forth.

29. In a knitting machine, a series of needles, a set of needle cams including a cam for moving the needles into yarn-taking position, a series of jacks, movable parallel to the needles, a cam contacting with the jacks for elevating the jacks to move needles into the field of action of said needle cams, and means located wholly at the needle side of the bed for preventing the elevation of selected jacks by said cam means, substantially as set forth.

30. In a knitting machine, a series of needles, a set of needle cams including a cam for moving the needles into yarn-taking position, a series of jacks extending approximately parallel to the needles, means for actuating the jacks to move needles into the field of action of said last-named cam, elongated sub-jacks extending approximately parallel to the needles and controlling the relation of said jacks to their actuating means, and selective means for actuating the sub-jacks, substantially as set forth.

31. A knitting machine having a needle bed, cams arranged in a plurality of sets at the needle side of the bed, independent needles actuated by cams of one set, projectors for moving needles selectively into position for engagement by a cam of said set, said projectors having butts positioned to engage a cam constituting a second set, and means acting selectively on the projectors to take their butts out of the field of action of said cam including sub-jacks actuated by cams in a third set, substantially as set forth.

32. In a knitting machine, a needle cylinder, a set of needle cams, needles having butts normally out of range of said needle cams, jacks normally operative to raise the needles into the range of a needle cam, pattern means outside the needle cylinder, and connections from said pattern means to the jacks for rendering the jacks selectively inoperative, said connections being also outside the needle cylinder, and said pattern means and connections being rotatable relatively to the needle cylinder, substantially as set forth.

33. In a knitting machine, a slotted needle cylinder, needles therein, needle cams, jacks movable lengthwise of the needle slots for raising the needles, vertically-extending radially displaceable elements at the outer side of the needle cylinder each controlling an individual jack, and means outside the needle cylinder for selectively acting on said elements at different points along the length of said elements, substantially as set forth.

34. In a knitting machine, a slotted needle cylinder, needles therein, needle cams, jacks movable lengthwise of the needle slots for raising the needles, elongated radially displaceable elements lying in the slots of the cylinder parallel to the jacks each controlling the operation of one of said jacks, butts on each of said radially displaceable elements projecting outward from said slots, and means for selectively acting on said butts, substantially as set forth.

35. A circular knitting machine having a slotted needle bed, cams arranged in a plurality of sets, independent needles in the slots of the bed actuated by cams of one set, jacks in the slots for moving needles upward into position to engage a cam of said set, said jacks having butts positioned to engage a cam of a second set and the jacks resiliently holding their butts out of the slots, and means acting selectively on the jacks to take their butts out of the field of action of said last-named cam, substantially as set forth.

36. A knitting machine having a needle cylinder, cams arranged in a plurality of sets about said cylinder, independent needles actuated by cams of one set, slidable jacks for raising the needles into position to engage a cam of said set, a cam for moving all the jacks, controlling means for selectively determining the operative relation of said cam and the individual jacks including sub-jacks having butts at different elevations, and individually movable cams outside the needle cylinder acting on said butts at corresponding elevations, substantially as set forth.

37. In a knitting machine, a series of needles, a set of needle cams, a series of jacks, means for actuating the jacks to move needles into the field of action of a needle cam, a series of sub-jacks controlling the relation of said jacks to their actuating means, butts at different points on the sub-jacks, and selective actuating means for engagement with said butts, substantially as set forth.

38. A circular knitting machine comprising a needle cylinder, a series of needles therein, a set of revolving needle cams, means for moving the needles into operative relation with the needle cams including a trick wheel rotatable about an axis parallel to that of the needle cams, interchangeable strip-like elements extending lengthwise of said wheel, selectively-operable connections from said trick wheel to the needles, and pattern controlled means for rotating the trick wheel, substantially as set forth.

39. In a knitting machine, a stationary needle cylinder, a revolving cam ring, a series of needles in the cylinder, a series of jacks for raising the needles, a series of sub-jacks with differentiated butts, means for actuating the jacks, and means carried by the cam ring outside the needle cylinder, said means acting selectively on the butts of the sub-jacks for controlling the operation of the jacks by the jack-actuating means.

40. In a knitting machine, a stationary slotted needle cylinder, a revolving cam ring, a series of needles in the slots of the cylinder, a series of jacks in said slots for raising the needles, butts on the jacks resiliently held out of the slots, a series of sub-jacks with differentiated butts, a jack cam and means carried by the cam ring outside the needle cylinder for acting selectively on the butts of the sub-jacks to act on the jacks for controlling their relation to the jack cam.

41. In an independent needle knitting machine, knitting needles and means for elevating them selectively comprising strip-like elements individual to said needles, said strip-like elements each having one or more butts variously located along their length at the needle side of the needle bed and having a movement transversely of the needle bed, pattern means, and cams between said pattern means and said butts adapted to act on each butt for imparting such transverse movement to the strip-like elements, said pattern means and said cams moving constantly past said elements in the operation of the machine.

42. In a knitting machine of the type having a needle bed and needles therein, a longitudinally slotted trick-wheel rotating on an axis parallel to the needles, interchangeable tricks in the slots of the wheel said tricks having frangible butts, a stack of levers each having a lug at the side next the trick-wheel in a row parallel to an operatively positioned trick whereby a trick may operate any or all of the levers according to its contour, and elements of the knitting machine selectively controlled by said levers for varying the operation of the machine.

43. An independent needle circular knitting machine including a set of rockable members adapted to act selectively on elements of the machine to vary the fabric being produced, a trick-wheel comprising a slotted member adapted to be moved about its own axis, said trick-wheel and said rocking members being relatively rotatable about the axis of the machine, interchangeable trick means in the slots of the trick-wheel said trick means having portions on at least one part thereof for acting selectively on said rockable members and thereby constituting a pattern set up, and pattern control means to determine whether on the next relative rotation of the wheel and said members (or at the next feed), the pattern set up remains the same or is changed.

44. In a circular knitting machine a series of instrumentalites aiding in the stitch formation, elements each associated individually with said instrumentalities, a trick-wheel with its axis parallel to said knitting machine, said elements and said trick wheel having frangible butts in a plurality of planes, means between the butts on said trick-wheel and the butts on said elements, said means moving in each of said plurality of planes under control of said trick-wheel butts to move said elements radially, and means for relatively rotating said trick-wheel and said elements.

45. In a circular knitting machine of the type having a needle holder and a series of needles therein, a series of instrumentalities adapted to co-operate therewith, a series of control elements each associated individually with said instrumentalities and having butts in a plurality of planes, a trick-wheel element, means for relatively rotating said wheel element and said control element about the axis of the machine, said wheel element having a plurality of butts at different points lengthwise of the axis of the machine, and means for transmitting the selective control from the butts on said trick element to the butts on said control elements to move the same transversely.

46. A pattern device for use in knitting machines comprising a series of elements each adapted to be associated individually with an instrumentality of the knitting machine, said elements having a series of frangible selecting means in a plurality of planes, a trick-wheel having a series of like selecting means around its periphery and at different points relatively to the length of the wheel, means for relatively rotating said wheel and said elements about the axis of the machine, and means for transmitting the selective control from the selecting means on said wheel to the selecting means on said elements during said movement to move said elements transversely.

47. A pattern device for use in knitting machines comprising a series of elements each adapted to be associated individually with an instrumentality of the knitting machine, said elements having series of closely adjacent butts in a plurality of planes, a trick-wheel having series of removable butts around its periphery and at different points along the length of the wheel, means for relatively rotating said wheel and said elements about the axis of the machine, and means for transmitting the selective control from the butts on said wheel to the butts on said elements during said movement.

48. A control mechanism for a knitting machine of the type having a series of instrumentalities, comprising a series of elements each adapted to be associated individually with an instrumentality of the machine to control the same, a pattern wheel having frangible butts disposed around its periphery in a plurality of planes, a series of cams each movable individually in one of said planes and adapted to be moved by butts on said wheel, said cams transmitting their movements to said elements and thereby controlling the said instrumentalities.

49. A method of setting up a design for instrumentalities of a knitting machine which comprises the steps of braking off certain predetermined frangible butts from control means each of which is adapted to be associated individually with said instrumentalities, and breaking off certain predetermined frangible butts from tricks which are adapted to be secured on the trick-wheel so that the remaining butts on said means and on said wheel will cause the instrumentalities to form the design as the machine is operated.

50. In a circular knitting machine, a series of instrumentalities aiding in the stitch formation, elements cooperating with said instrumentalities to vary the action thereof, a trick-wheel with its axis parallel to the axis of said knitting machine, said elements and said wheel providing frangible projections in a plurality of planes, and means between the projections on said trick-wheel and the projections on said elements, said means moving selectively and individually in each of said plurality of planes under control and by means of said wheel projections to move said element projections transversely of the axis of said knitting machine.

51. In a circular knitting machine a series of instrumentalities aiding in the stitch formation, a series of control elements therefor presenting a plurality of frangible projections arranged in a plurality of planes, a trick-wheel provided with projecting butts arranged at different points lengthwise of the axis of the machine, and a series of cams, one in each of said planes adapted to be selectively moved in a transverse direction by a butt on said wheel and to transmit said movement to a selected projection on said element to move the latter substantially transversely.

52. In a circular knitting machine a series of instrumentalities aiding in the stitch formation, a series of control elements therefor presenting projections in a plurality of planes, a pattern wheel provided with frangible projections arranged at different points lengthwise of the axis of the machine, and a series of cams in said planes extending between said wheel and said elements to transmit the selective projection control from the wheel to the elements.

53. In a circular knitting machine, a slotted bed, independent instrumentalities movable in said slots in said bed, members each individually associated with one of said instrumentalities respectively in their respective slots, a cam movable past said bed, said members having related thereto butts projecting from said slots in the path of said cam, said members also having related thereto a plurality of butt selecting levels, and a plurality of pattern controlled cams to act on said last-named butt levels for moving said members to carry said first-named butts out of reach of their cam.

54. In a knitting machine, a series of needles, a series of sliding jacks acting on the needles, a series of pivoted sub-jacks having differentiated frangible butts, means for normally actuating the jacks, and means acting selectively on said butts to render the jacks inoperative, substantially as set forth.

55. In a circular knitting machine, a series of independent instrumentalities, a bed slotted to receive said instrumentalities, means for actuating them including jacks in said slots, means for actuating the jacks including a cam having relative movement crosswise of the slots in said bed, means for controlling the engagement of the jacks and their actuating means including sub-jacks, and a plurality of selective actuating cams along the axis of the machine for the sub-jacks at the same side of the bed as said jack cam, substantially as set forth.

56. In a knitting machine, a slotted needle bed, a series of independent needles having butts projecting from the slots in said bed, means for actuating the needles including slidable jacks, means for actuating the jacks, means for controlling the engagement of the jacks and their actuating means including sub-jacks having frangible butts projecting from said slots in the same direction as the needle butts, and selective actuating means for the sub-jacks, substantially as set forth.

57. In a circular knitting machine, a series of independent needles, means for actuating them including vertically slidable jacks, means for actuating the jacks, means for controlling the engagement of the jacks and their actuating means including sub-jacks, selective actuating means for the sub-jacks including differentiated butts on the sub-jacks, and a plurality of selecting cams for selective engagement with said butts, substantially as set forth.

58. In a circular knitting machine, a series of independent needles, means for actuating them including vertically slidable jacks, means for actuating the jacks, means for controlling the engagement of the jacks and their actuating means including pivoted sub-jacks, selective actuating means for the sub-jacks including butts on the sub-jacks, and a plurality of selecting cams for selective engagement with said butts certain sub-jacks having butts at spaced intervals in greater number than others, substantially as set forth.

59. In a circular knitting machine, a series of independent instrumentalities, means for actuating them including vertically slidable jacks, means for actuating the jacks, means for controlling the engagement of the jacks and their actuating means including pivoted sub-jacks, selective actuating means for the sub-jacks including butts on the sub-jacks differently located along the length of the sub-jacks, and a plurality of selecting cams positioned in series for selective engagement with said butts, substantially as set forth.

60. In a circular knitting machine, a series of independent needles, means for actuating them including vertically slidable jacks, means for actuating the jacks, means for controlling the engagement of the jacks and their actuating means including sub-jacks, and selective actuating means for the sub-jacks including butts on the sub-jacks, cams positioned in series for selective engagement with said butts certain of the sub-jacks having a single butt, and others having a plurality of butts for engagement respectively with different cams of said series, substantially as set forth.

61. A knitting machine having a needle cylinder, cams arranged in a plurality of sets about said cylinder, independent needles actuated by cams of one set, resilient jacks controlling individual needles, a cam for moving the jacks, pattern elements operatively related to the jacks said pattern elements having butts at different elevations, and individually movable cams at corresponding elevations for acting selectively on the pattern elements to flex corresponding jacks thereby moving their butts out of the field of action of the jack cam, substantially as set forth.

62. In a knitting machine, a slotted needle bed, a needle in a slot of said bed, a resilient jack in the slot having a part in operative relation to the needle and having a butt projecting from the slot, a pivoted sub-jack mounted in the slot, and pattern mechanism acting on the sub-jack to flex the jack to withdraw the butt into the slot.

63. In a circular knitting machine having a needle cylinder and a series of needles therein, a series of instrumentalities each adapted to be associated individually with said needles to selectively cooperate therewith by means of selective control thereon, said instrumentalities having selective control means including a plurality of frangible butts extending from said instrumentalities in spaced relation to each other and along the axis of the machine, said butts being broken off as desired to provide the desired selective cooperation, and cam means operable selectively along the axis of the machine upon the remaining butts to selectively operate the instrumentalities said cam means being adapted to be selectively operated by pattern mechanism.

64. In a circular knitting machine, a series of instrumentalities aiding in the stitch formation, elements each adapted to be associated individually with said instrumentalities, said elements having frangible butts in a plurality of planes lengthwise of the axis of the machine, and cam means operable selectively upon the butts in said plurality of planes said cam means being adapted to be selectively operated by pattern mechanism.

65. A pattern selecting means for use in knitting machines to selectively control needle cooperating instrumentalities comprising a series of frangible selecting means in a plurality of planes along the axis of the machine operatively related to said instrumentalities, cam means selectively operable upon said selective means in each of said plurality of planes, and means for relatively rotating said cam means and said instrumentalities said cam means being adapted to be selectively operated by pattern mechanism.

66. A circular knitting machine comprising a slotted needle bed, a needle slidable in a slot in said bed, a similarly slidable jack with operating means projecting therefrom, said jack being movable with the needle and independently thereof, means on the jack for engaging the needle to select the same, a cam directly engaging said operating means to actuate the needle, and selective means acting on the outer face of the jack to prevent engagement of said operating means and the jack-cam, substantially as set forth.

67. In a circular knitting machine, a slotted bed, needles slidable in the slots of the bed, jacks in the slots movable transversely and longitudinally thereof, a jack cam acting on the jacks to move the same longitudinally to cause the needles to be raised, a plurality of selecting cams at the needle side of the bed adapted to act on the jacks at different horizontal levels, and a trick wheel for moving the selecting cams selectively toward the jacks to move the same selectively transversely of the slots and out of reach of the jack cam.

68. A circular knitting machine having a slotted needle bed and independently operable needles therein, a set of needle cams moving relative to said bed to operate the needles, rockable members with at least one end in a slot to move the corresponding needle, a trick wheel comprising a slotted member rotating about the machine and adapted to be moved about its own axis, interchangeable trick means in the slots of the trick wheel said trick means having portions on at least one part thereof for acting selectively on said rockable members and thereby constituting a pattern set up, and pattern control means to determine whether during the next rotation of the wheel about the machine the pattern set-up remains the same or is changed.

69. A knitting machine having a slotted needle bed and independently operable needles therein, a set of needle cams moving relative to said bed to operate the needles, rockable members one in each slot to move the needles, a trick wheel comprising a slotted member rotating about the machine, interchangeable trick means in the slots of the trick wheel presenting a series of rockable-member-actuating portions active during a revolution to relate selected needles to the cams said series of actuating portions constituting the pattern set-up during that revolution, and pattern means acting upon the trick wheel as it goes past the said means to provide a new set-up of actuating portions as the series during the next revolution or to allow the old series to remain.

70. A circular knitting machine having a slotted needle bed and independently operable needles therein, a set of needle cams moving relative to said bed to operate the needles, rockable members one in each slot to move the needles into operative relation with the needle cams, a trick wheel unit comprising a slotted member moving past the needle slots in timed relation with the needle cams, interchangeable trick means in the slots of the trick wheel presenting to the rockable members a series of member actuating portions during a revolution said series of portions constituting the pattern set-up during a revolution and acting upon the members to select them and operatively relate their needles to the cams said series containing operative and inoperative portions, pattern means at one side of the machine acting upon the wheel as it goes past said means to change the actuating series of portions and the set-up during the next course or to allow the series of actuating portions and the set-up to remain.

In witness whereof, I have hereunto set my hand at Philadelphia, county of Philadelphia, State of Pennsylvania, this 24th day of April, 1930.

CAROLINE F. AMES,
*Administratrix of the Estate of Elmer U. Ames, deceased.*